(12) United States Patent
Guan

(10) Patent No.: US 7,327,533 B2
(45) Date of Patent: Feb. 5, 2008

(54) PROCESS AND STRUCTURE FOR A PERPENDICULAR WRITER HAVING AN EXCHANGE COUPLING DISCONTINUITY

(75) Inventor: Lijie Guan, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 433 days.

(21) Appl. No.: 10/980,483

(22) Filed: Nov. 3, 2004

(65) Prior Publication Data

US 2006/0092567 A1     May 4, 2006

(51) Int. Cl.
    *G11B 5/21*     (2006.01)
(52) U.S. Cl. ............................................... 360/126
(58) Field of Classification Search ............... 360/126
    See application file for complete search history.

(56) References Cited

U.S. PATENT DOCUMENTS 6,072,671 A * 6/2000 Gill ............................ 360/126
6,721,131 B2   4/2004 Litvinov et al. ............ 360/125
6,909,579 B2 * 6/2005 Lee et al. ................... 360/126
7,075,750 B2 * 7/2006 Bedell et al. ............... 360/126
7,170,712 B2 * 1/2007 Sato ........................... 360/126
2002/0131203 A1   9/2002 Litvinov et al. ............ 360/125
2003/0193746 A1* 10/2003 Otsuka ....................... 360/126
2005/0024766 A1*  2/2005 Khera et al. ................ 360/125

* cited by examiner

*Primary Examiner*—Jefferson Evans
(74) *Attorney, Agent, or Firm*—Saile Ackerman LLC; Stephen B. Ackerman

(57) ABSTRACT

The non-zero remanence state that is associated with a single pole writer often results in self-pole-erasure (SPE). This problem has been overcome by inserting a very thin exchange de-coupling layer into the magnetic circuit of the write pole. This facilitates vortex formation at the pole tip region so the remanent field is significantly reduced, along with pole erasure. Because of the small thickness of this decoupling layer, the increase of magnetic reluctance due to the insertion of the exchange-breaking gap is negligible and the efficiency of writing is not affected.

32 Claims, 4 Drawing Sheets

PROCESS AND STRUCTURE FOR A PERPENDICULAR WRITER HAVING AN EXCHANGE COUPLING DISCONTINUITY

FIELD OF THE INVENTION

The invention relates to the general field of vertical magnetic writers with particular reference to the pole erasure problem.

BACKGROUND OF THE INVENTION

As magnetic recording is pushed to higher areal densities, perpendicular media may offer the advantage of thermal stability over longitudinal media. Despite the rapid progress of perpendicular recording technology in recent years, there remain a few technical challenges. One of these is the non-zero remanence state that is associated with a single pole writer after the write current has been terminated, often referred as self-pole-erasure (SPE).

The physical origin of SPE is the strong ferromagnetic exchange coupling of pole tip while in its remanent state, which aligns the magnetization vertically and causes the erasure of data on disk. SPE will be aggravated when the perpendicular media are DC magnetized and the magnetic field generated from said perpendicular media causes the vertical remanent state to be energy-favorable.

This invention improves pole erasure performance associated with a PMR writer. It provides an alternative solution to the pole erasure problem by changing only the geometry/structure of the main pole, without changing pole materials. The process is compatible with current practice. When combined with future material improvements, even greater reductions of pole erasure can be expected.

A routine search of the prior art was performed with the following references of interest being found: In U.S. Pat. No. 6,721,131 and in U.S. Patent Application 2002/0131203, Litvinov et al disclose a decoupling layer between high and low magnetic moment portions of a write pole to minimize magnetic remanence. In order to minimize changes to the process for manufacturing their write head they place this decoupling layer in a plane normal to the ABS (air bearing surface), thereby surrendering the possibility of shaping the pole piece so as to concentrate the write flux in the pole tip. The present invention teaches a structure and process whereby the decoupling layer is placed in a plane that is parallel to the ABS.

SUMMARY OF THE INVENTION

It has been an object of at least one embodiment of the present invention to reduce or eliminate self-pole-erasure by a vertical magnetic write head.

Another object of at least one embodiment of the present invention has been to achieve this with a minimum of modification of the write head structure currently in use.

Still another object of at least one embodiment of the present invention has been to achieve this without requiring that the materials used to form the write pole be changed.

A further object of at least one embodiment of the present invention has been to provide a process for manufacturing said improved write head.

These objects have been achieved by inserting a very thin exchange de-coupling layer into the magnetic circuit of the write pole. This facilitates vortex formation at the pole tip region so the remanent field is significantly reduced, along with pole erasure. Because of the small thickness of this decoupling layer, the increase of magnetic reluctance due to the insertion of the exchange-breaking gap is negligible and the efficiency of writing is not affected.

DESCRIPTION OF THE PREFERRED EMBODIMENTS

In most current PMR writer designs, the main pole is processed from one layer of a continuous thin film. So the exchange coupling is also continuous. By introducing a very thin exchange de-coupling layer, vortex formation is facilitated in the pole tip region and the remanent field is significantly reduced, along with pole erasure. Because of the small thickness of this decoupling layer, the increase of magnetic reluctance due to the exchange-breaking gap is negligible and the efficiency of writing is not affected.

Figures 1A, 1B:
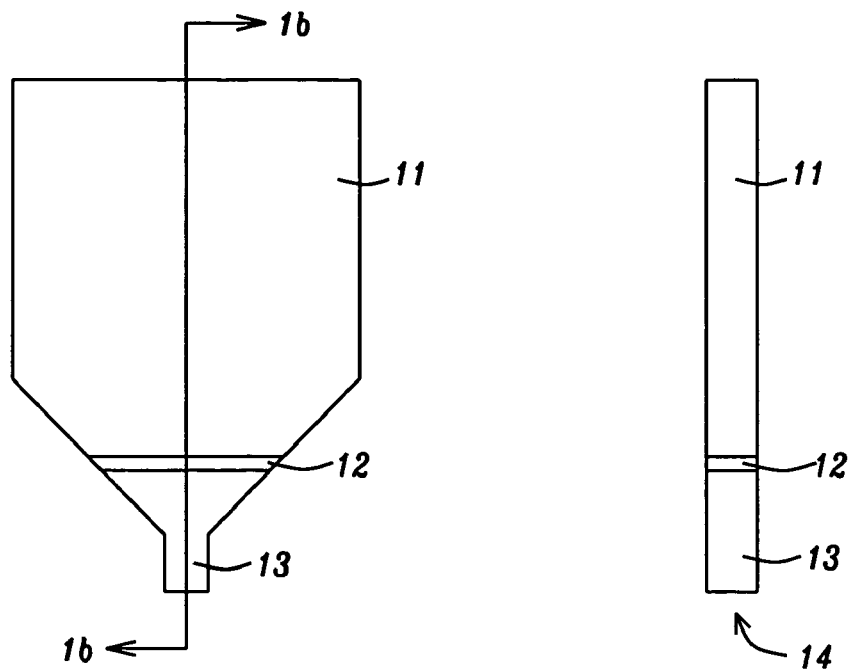
FIGS. 1a and 1b are plan and cross-sectional views, respectively that show the structure of the invention.
Figure 2:
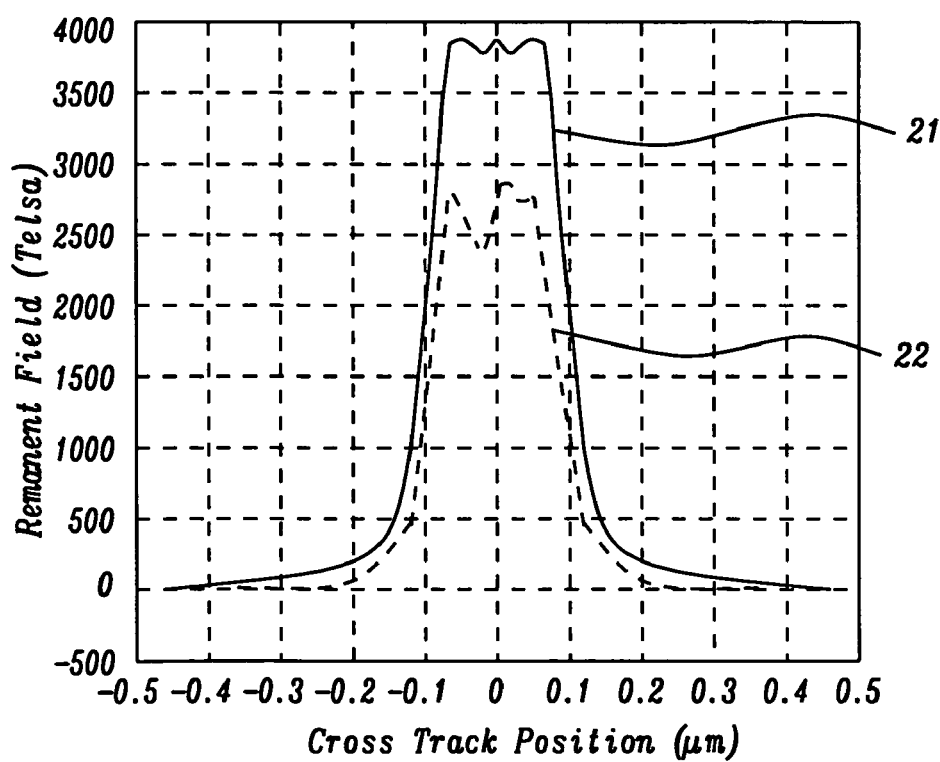
FIG. 2 compares plots of remanent magnetization as a function of distance from the pole tip for a conventional writer and one built according to the teachings of the invention.

FIGS. 1a and 1b show plan and cross-sectional views respectively of the invented perpendicular write head. Seen there are yoke portion 11 and pole tip 13 between which has been inserted exchange-breaking layer 12. FIG. 2 shows the simulated perpendicular field in its remanent state for PMR heads with and without a discontinuity in the exchange coupling. When there is broken exchange decoupling, vortex formation is facilitated (curve 22). Without exchange decoupling, however, the magnetization tends to align vertically so the remanent field is significantly larger (curve 21). In the simulation, the distance of the exchange-breaking gap from ABS (air bearing surface) 14 was 0.4 microns. Due to the small gap thickness, the increase of magnetic reluctance resulting from the blocking of the exchange coupling was negligible (less than about 5%) and the writing efficiency was not measurably affected.

Figure 3:
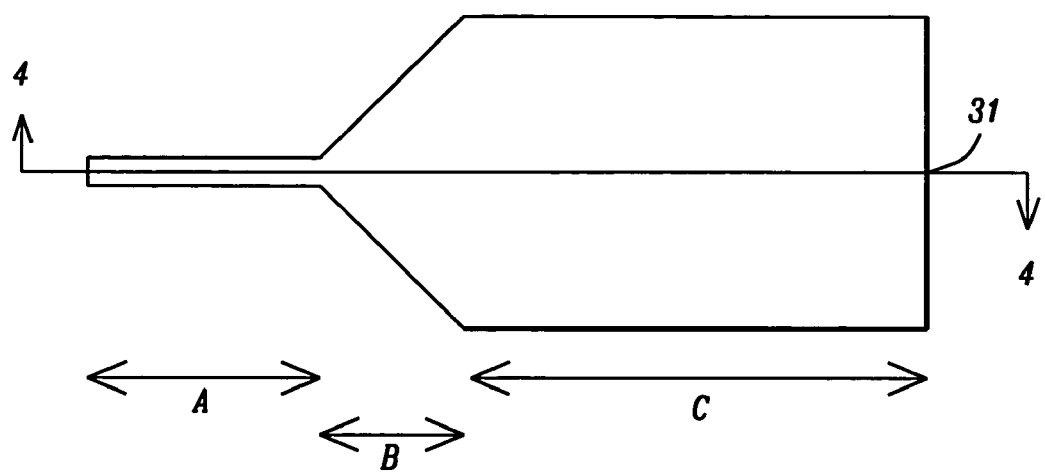
FIGS. 3 and 4 illustrate the starting point for the process of the invention.
Figure 4:
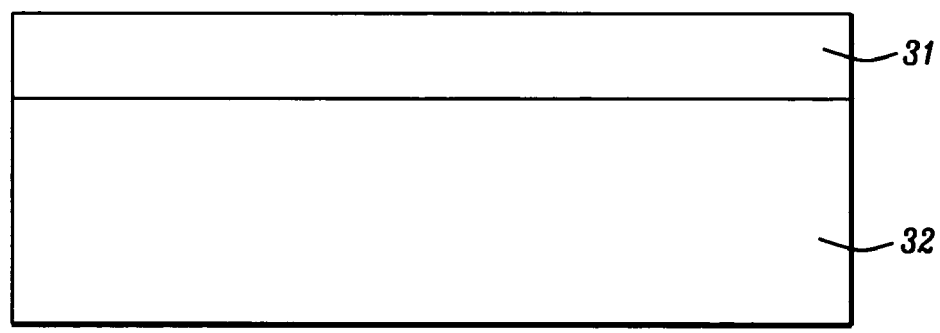

We now disclose the invention in greater detail through a description of a process for its manufacture. This description will also serve to further clarify the structure of the invention. Referring next to FIGS. 3 and 4, the process of the invention begins with the provision of base layer 32 on the top of a completed reader structure (not shown) onto whose surface is deposited layer 31 of a material having high saturation magnetic induction. Layer 32 would typically be of a material such as alumina, while layer 31 could be any alloy of Co, Fe, or Ni, including materials such as CoFe, CoFeNi, with CoFeNi being preferred. Layer 31 is deposited to a thickness between about 0.1 and 2 microns.

Layer 32 and layer 31 are simultaneously patterned into the shape shown in FIG. 3. As can be seen in FIG. 3, said shape comprise three contiguous regions:

Region A, the write pole, has a constant width 32, between about 0.05 and 0.3 microns, and length 33 of up to about 0.5 microns, measured from the ABS. Region C, the yoke, has a constant width 34 (that is greater than width 32) of between about 5 and 40 microns, and length 35, between about 5 and 30 microns. Region B connects regions A and C. It has length 36, and a width that varies from that of 32 to that of 34.

Figure 5:
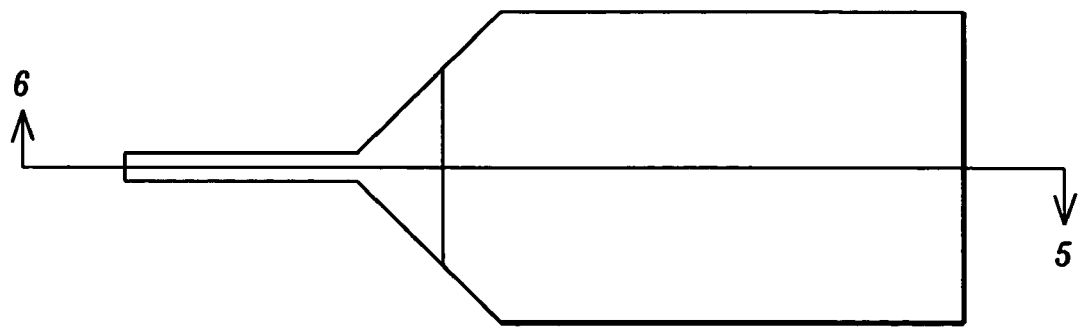
FIGS. 5 through 8 show how the exchange decoupling layer is inserted into the structure.
Figure 6:
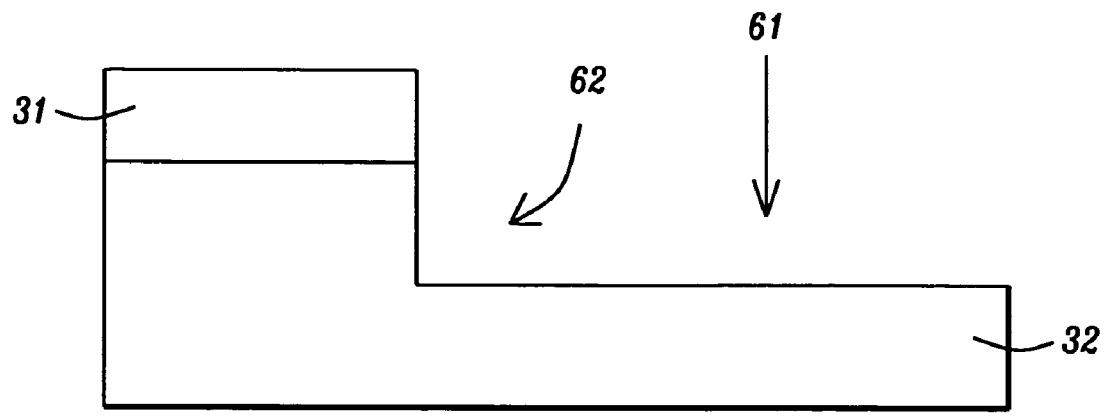
Figure 7:
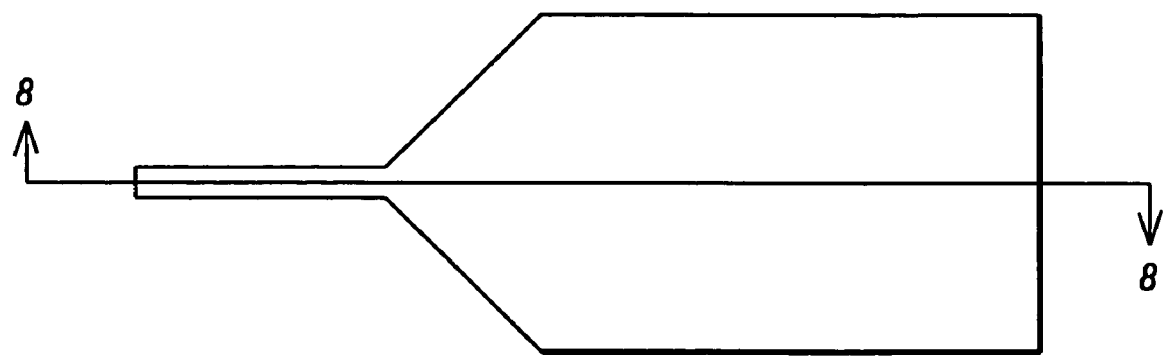
Figure 8:
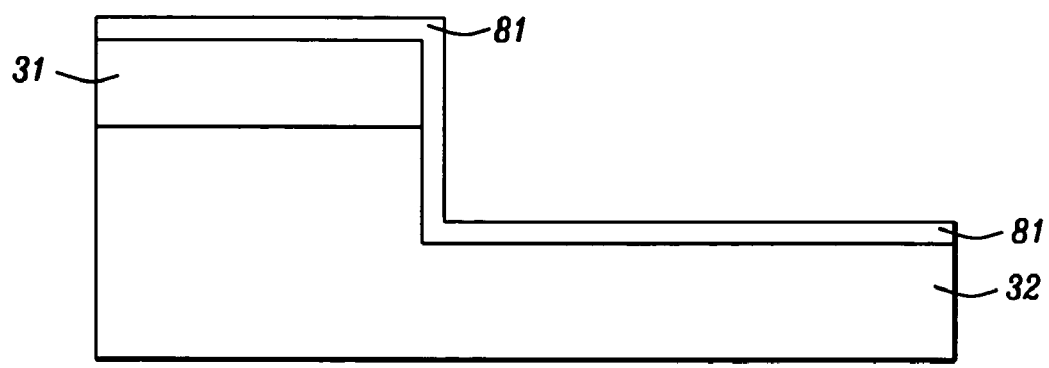
Figure 9:
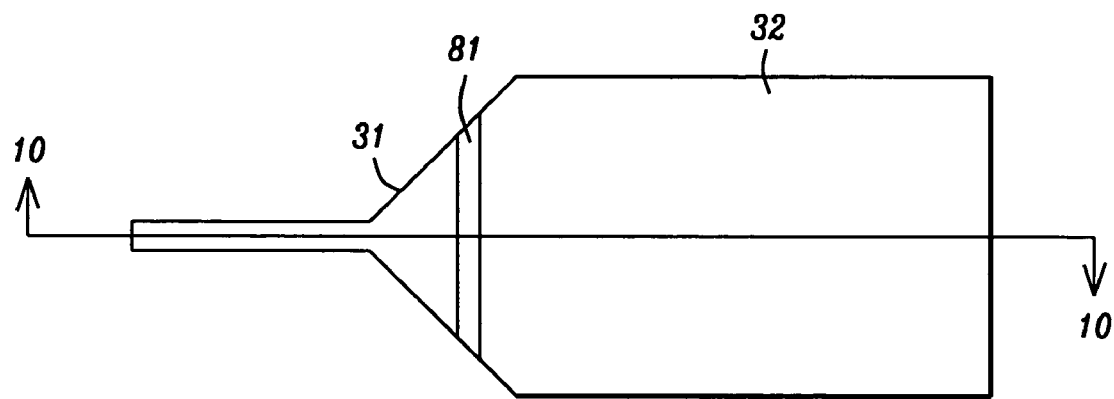
FIGS. 9 and 10 show the end product of the process of the invention.

Moving on to FIGS. 5 and 6, trench 61 is formed. It extends downwards from the upper surface to a depth 62, between about 0.1 and 1 microns, that exceeds the thickness of layer 31. Sidewalls 62 of the trench are, preferably, vertical and are generally located within region B at a distance of between about 0.1 and 2 microns from the ABS. This is followed by the deposition of layer 81 of non-magnetic material (such as Ru, Pd, Cu, or Ta that uniformly coats trench 61's sidewalls to a thickness of between about 1 and 200 Angstroms, as illustrated in FIGS. 8 and 9.

Figure 10:
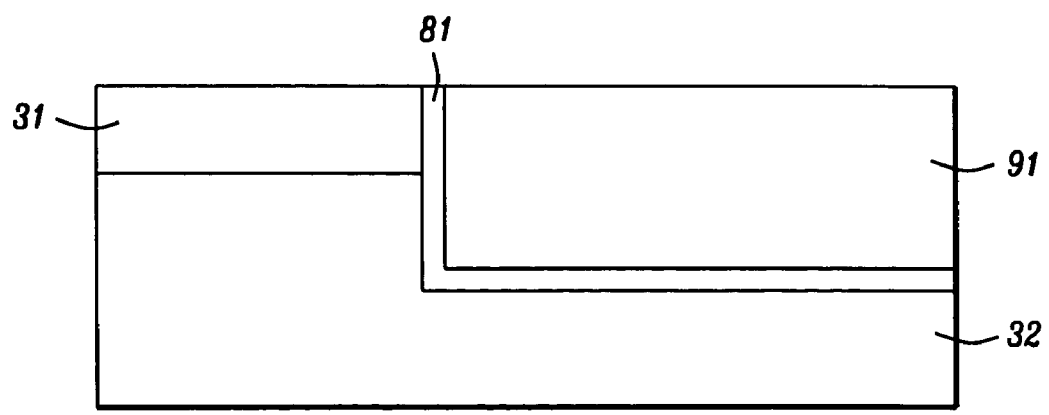

Trench 61 is then over-filled with additional high magnetic saturation material 91, optionally with a different composition from layer 31, following which the surface is planarized until the original upper surface of layer 31 is exposed once more. The completed device now has the appearance illustrated in FIGS. 9 and 10.

What is claimed is:

1. A method to eliminate self erasure of a pole that is part of a perpendicular magnetic write head, having an ABS, said write head being part of a magnetic circuit, comprising:
    inserting in said magnetic circuit a non-magnetic layer between 0.1 and 2 microns from said ABS, said non-magnetic layer having a thickness that is sufficient to block exchange coupling between said pole and said write head.

2. The method of claim 1 wherein said non-magnetic layer is no more than about 200 Angstroms thick.

3. A process to manufacture a perpendicular magnetic write head, comprising:
    providing a base layer and depositing thereon a first layer, having a first thickness and an upper surface, of a material having high saturation magnetic induction;
    simultaneously patterning both said base layer and said first layer into three contiguous regions:
        a first region having a constant first width and a first length,
        a second region having a constant second width, that is greater than said first width, and a second length,
        and a third region, having a third length and a varying width, between said first and second regions;
    forming a trench, having a sidewall, that extends from said upper surface to a depth that exceeds said first thickness;
    depositing a layer of non-magnetic material that uniformly coats said sidewall to a second thickness;
    over-filling said trench with a second layer of said high saturation material; and
    then planarizing until said upper surface is exposed.

4. The process recited in claim 3 wherein said base layer is alumina.

5. The process recited in claim 3 wherein said material having high saturation magnetic induction is selected from the group consisting of alloys of Co, Fe, and Ni, including CoFeNi and FeNi.

6. The process recited in claim 3 wherein said material having high saturation magnetic induction is deposited to a thickness between about 0.1 and 0.5 microns.

7. The process recited in claim 3 wherein said first width is between about 0.05 and 0.3 microns.

8. The process recited in claim 3 wherein said first length is up to 0.5 microns.

9. The process recited in claim 3 wherein said second width is between about 5 and 40 microns.

10. The process recited in claim 3 wherein said second length is between 5 and 30 microns.

11. The process recited in claim 3 wherein said third length is between about 1 and 10 microns.

12. The process recited in claim 3 wherein said trench depth is between about 0.1 and 1 microns.

13. The process recited in claim 3 wherein said sidewall is within 45% of vertical.

14. The process recited in claim 3 wherein said non-magnetic material is selected from the group consisting of Ru, Pd, Cu, and Ta.

15. The process recited in claim 3 wherein said non-magnetic material is deposited to a thickness between about 1 and 200 Angstroms.

16. The process recited in claim 3 wherein said sidewall is located within said third region.

17. The process recited in claim 3 wherein said sidewall is located between about 0.1 and 2 microns from an air bearing surface.

18. A perpendicular magnetic write head, having an ABS and a pole tip, that is free of self erasure and that is part of a magnetic circuit, comprising:
    as part of said magnetic circuit, a non-magnetic layer located between 0.1 and 2 microns from said ABS, said non-magnetic layer having a thickness sufficient to block exchange coupling between said pole tip and said write head.

19. The write head of claim 18 wherein said non-magnetic layer is between about 1 and 200 Angstroms thick.

20. A perpendicular magnetic write head, having an ABS, comprising:
    on a substrate, two layers of a high saturation magnetic induction material, said layers having first and second thicknesses while sharing a common upper surface, and being separated by a layer of non-magnetic material;
    said first thickness being less than said second thickness; and
    said perpendicular magnetic write head having three contiguous regions:
        a first region having a constant first width and a first length and wherein the layer of high saturation magnetic induction material has the first thickness,
        a second region having a constant second width, that is greater than said first width, and a second length,
        and a third region, having a third length and a varying width, located between said first and second regions.

21. The perpendicular magnetic write head described in claim 20 wherein said substrate is alumina.

22. The perpendicular magnetic write head described in claim 20 wherein said material having high saturation magnetic induction is selected from the group consisting of alloys of Co, Fe, and Ni, including CoFeNi and FeNi.

23. The perpendicular magnetic write head described in claim 20 wherein said non-magnetic material is selected from the group consisting of Ru, Pd, Cu, and Ta.

24. The perpendicular magnetic write head described in claim 20 wherein said first width is between about 0.05 and 3 microns.

25. The perpendicular magnetic write head described in claim 20 wherein said first length is up to 0.5 microns.

26. The perpendicular magnetic write head described in claim 20 wherein said second length is between 5 and 30 microns.

27. The perpendicular magnetic write head described in claim 20 wherein said third length is between about 1 and 10 microns.

28. The perpendicular magnetic write head described in claim 20 wherein said first thickness of high saturation material is between about 0.1 and 0.5 microns.

29. The perpendicular magnetic write head described in claim 20 wherein said second thickness of high saturation material is between about 0.1 and 1 microns.

30. The perpendicular magnetic write head described in claim 20 wherein said non-magnetic material has a thickness between about 1 and 200 Angstroms.

31. The perpendicular magnetic write head described in claim 20 wherein said separation layer of non-magnetic material is located within said third region.

32. The perpendicular magnetic write head described in claim 20 wherein said separation layer of non-magnetic material is located between about 0.1 and 2 microns from, and parallel to, said ABS.

* * * * *